United States Patent
Henrikson

(10) Patent No.: US 7,570,616 B2
(45) Date of Patent: Aug. 4, 2009

(54) MOBILE CELLULAR COMMUNICATION DEVICE PRESENTATION OF USER NOTIFICATION OF ACTIVE COMMUNICATION SESSION HANDOFF BETWEEN RADIO TECHNOLOGIES THAT ARE NOT DIRECTLY COMPATIBLE

(75) Inventor: Eric Harold Henrikson, Redmond, WA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1006 days.

(21) Appl. No.: 10/410,473

(22) Filed: Apr. 9, 2003

(65) Prior Publication Data
US 2004/0218564 A1 Nov. 4, 2004

(51) Int. Cl.
*H04W 4/00* (2009.01)
*H04W 36/00* (2009.01)

(52) U.S. Cl. ................... 370/331; 370/338; 370/328; 455/436; 455/432.1; 455/426.1

(58) Field of Classification Search ............... 455/406, 455/436, 567, 432.1, 442, 444, 426.1; 370/328, 370/331, 338
See application file for complete search history.

(56) References Cited

U.S. PATENT DOCUMENTS

| | | | |
|---|---|---|---|
| 5,722,068 A | 2/1998 | Bartle et al. | |
| 5,742,905 A * | 4/1998 | Pepe et al. | 455/461 |
| 5,950,123 A * | 9/1999 | Schwelb et al. | 455/414.4 |
| 6,021,313 A * | 2/2000 | Koga | 340/7.56 |
| 6,038,444 A | 3/2000 | Schipper et al. | |
| 6,097,950 A * | 8/2000 | Bertacchi | 455/432.2 |
| 6,230,017 B1 * | 5/2001 | Andersson et al. | 455/456.6 |
| 6,256,504 B1 * | 7/2001 | Tell et al. | 455/456.2 |
| 6,591,103 B1 * | 7/2003 | Dunn et al. | 455/436 |
| 6,625,268 B1 * | 9/2003 | Wallenius | 379/114.28 |
| 6,665,718 B1 * | 12/2003 | Chuah et al. | 709/225 |
| 6,690,781 B2 * | 2/2004 | Creamer et al. | 379/201.12 |
| 6,744,753 B2 * | 6/2004 | Heinonen et al. | 370/338 |
| 6,819,945 B1 * | 11/2004 | Chow et al. | 455/567 |
| 6,829,473 B2 * | 12/2004 | Raman et al. | 455/406 |

(Continued)

OTHER PUBLICATIONS

TSGS1#4(99)490, TSG-SA Working group 1 (services) meeting #4, Quebec City, Canada, Jul. 5-9, 1999.*

*Primary Examiner*—Duc M Nguyen

(57) ABSTRACT

An apparatus in one example comprises a mobile cellular communication device that employs one or more of a plurality of radio technologies to support one or more communication sessions of a user over one or more of a plurality of radio networks. The plurality of radio technologies comprise a first radio technology and a second radio technology, wherein the first radio technology and the second radio technology comprise respective radio technologies that are not directly compatible. The one or more communication sessions comprise an active communication session of the user, wherein the active communication is associated with the mobile cellular communication device. The plurality of radio networks comprise a first radio network and a second radio network, wherein the first radio network employs the first radio technology, wherein the second radio network employs the second radio technology. Upon a handoff of the active communication session between the respective radio technologies that are not directly compatible of the first radio network and the second radio network, the mobile cellular communication device presents to the user one or more notifications of the handoff between the radio technologies that are not directly compatible.

25 Claims, 2 Drawing Sheets

U.S. PATENT DOCUMENTS

| | | | |
|---|---|---|---|
| 6,963,583 B1 * | 11/2005 | Foti | 370/467 |
| 7,039,423 B2 * | 5/2006 | Daniel et al. | 455/456.3 |
| 7,085,260 B2 * | 8/2006 | Karaul et al. | 370/352 |
| 7,184,765 B1 * | 2/2007 | Birnie et al. | 455/432.3 |
| 7,295,608 B2 * | 11/2007 | Reynolds et al. | 375/240.01 |
| 2001/0034243 A1 * | 10/2001 | Masuda et al. | 455/553 |
| 2002/0199208 A1 * | 12/2002 | Chang et al. | 725/131 |
| 2003/0174667 A1 * | 9/2003 | Krishnamurthi et al. | 370/328 |

* cited by examiner

MOBILE CELLULAR COMMUNICATION DEVICE PRESENTATION OF USER NOTIFICATION OF ACTIVE COMMUNICATION SESSION HANDOFF BETWEEN RADIO TECHNOLOGIES THAT ARE NOT DIRECTLY COMPATIBLE

TECHNICAL FIELD

The invention relates generally to wireless networks and more particularly to handoffs between wireless networks.

BACKGROUND

As the infrastructure of cellular networks becomes congested and overloaded with increased subscriber traffic, the network operators have investigated ways to increase service coverage areas and offload some of the traffic from the overloaded cellular infrastructure devices. To pursue these goals, the network operators have installed wireless infrastructure devices. These wireless infrastructure devices employ an unlicensed radio spectrum to communicate with the subscriber devices. For example, the wireless infrastructure devices are compatible with the 802.11 standard, published by the Institute for Electrical and Electronic Engineers, Inc. ("IEEE";3 Park Avenue, 17th Floor, New York, N.Y., 10016, U.S.A., http://www.ieee.org).

When a wireless network subscriber on an in-progress call travels between service coverage areas, the networks perform a handoff of the active communication session. Sometimes the handoff occurs between disparate networks. Disparate networks are networks that employ radio technologies that are not directly compatible. The disparate networks in one example comprise a cellular network and an 802.11 network.

When the handoff occurs between the disparate networks, the subscriber in one system experiences a change in the billing rate. For example, the billing rate for the subscriber increases upon a handoff of the in-progress call from the cellular network to the 802.11 network. One shortcoming of the system is that the subscriber is not aware of the change in the billing rate. For example, the subscriber learns of the change in the billing rate for service only after the bill has arrived.

Thus, a need exists for a promotion in timeliness of notification to a subscriber of a change in billing rate that results from a handoff of a call.

SUMMARY

The invention in one embodiment encompasses an apparatus. The apparatus comprises a mobile cellular communication device that employs one or more of a plurality of radio technologies to support one or more communication sessions of a user over one or more of a plurality of radio networks. The plurality of radio technologies comprise a first radio technology and a second radio technology, wherein the first radio technology and the second radio technology comprise respective radio technologies that are not directly compatible. The one or more communication sessions comprise an active communication session of the user, wherein the active communication is associated with the mobile cellular communication device. The plurality of radio networks comprise a first radio network and a second radio network, wherein the first radio network employs the first radio technology, wherein the second radio network employs the second radio technology. Upon a handoff of the active communication session between the respective radio technologies that are not directly compatible of the first radio network and the second radio network, the mobile cellular communication device presents to the user one or more notifications of the handoff between the radio technologies that are not directly compatible.

Another embodiment of the invention encompasses a method. A comparison of a first radio technology and a second radio technology is performed, upon a handoff of an active communication session of a mobile cellular communication device between the first radio technology and the second radio technology, to make a determination that the first radio technology and the second radio technology comprise radio technologies that are not directly compatible. One or more notifications are selected to provide to a user of the mobile cellular communication device based on the determination that the first radio technology and the second radio technology comprise radio technologies that are not directly compatible. The one or more notifications are communicated to the user of the mobile cellular communication device as an indication of the handoff of the active communication session between the radio technologies that are not directly compatible.

A further embodiment of the invention encompasses an article. The article comprises one or more computer-readable media. The article includes means in the computer-readable medium for performing a comparison of a first radio technology and a second radio technology, upon a handoff of an active communication session of a mobile cellular communication device between the first radio technology and the second radio technology, to make a determination that the first radio technology and the second radio technology comprise radio technologies that are not directly compatible. The article Includes means in the computer-readable medium for selecting one or more notifications to provide to a user of the mobile cellular communication device based on the determination that the first radio technology and the second radio technology comprise radio technologies that are not directly compatible. The article includes means in the computer-readable medium for communicating the one or more notifications to the user of the mobile cellular communication device as an indication of the handoff of the active communication session between the radio technologies that are not directly compatible.

DESCRIPTION OF THE DRAWINGS

Features of exemplary implementations of the invention will become apparent from the description, the claims, and the accompanying drawings in which:

DETAILED DESCRIPTION

Figure 1:
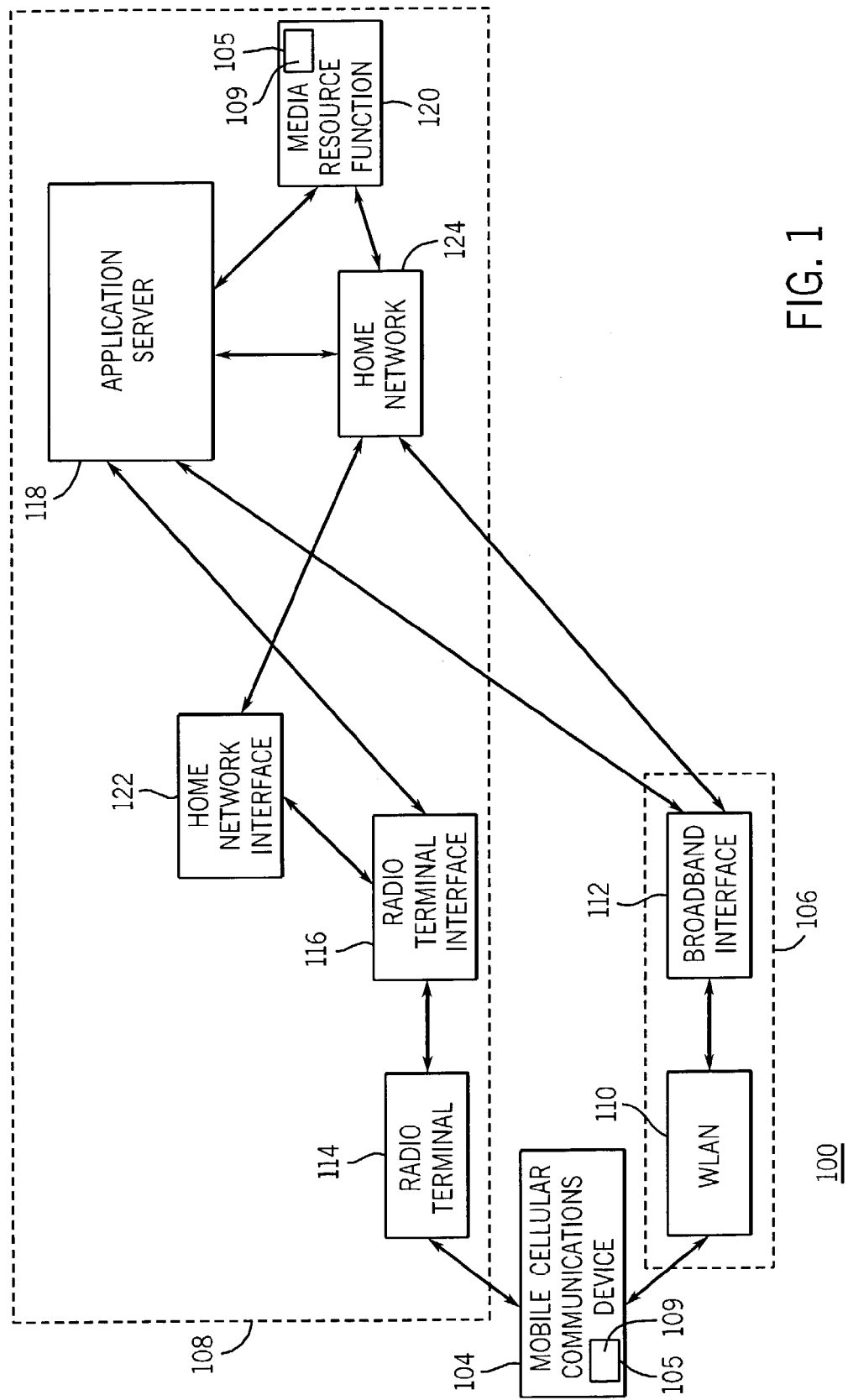
FIG. 1 is a representation of one example of an apparatus that comprises one or more mobile cellular communication devices and one or more radio communication network components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more mobile cellular communication devices 104 and a plurality of radio networks, for example, radio networks 106 and 108. The mobile cellular communication device 104 in one example comprises a cellular phone and/or a personal digital assistant ("PDA") and/or a laptop computer with a wireless communications card. In a further example, the mobile cellular communication device 104 is operable with one or more 802.11 standards, developed by the Institute for Electrical and Electronic Engineers, Inc. ("IEEE") (New York, N.Y., 10016, http://www.ieee.org). For example, the mobile cellular communication device 104 serves to allow a user (not shown) of the mobile cellular communication device 104 to receive one or more services from the radio network 106 and/or 108. In one example, the mobile cellular communication device 104 employs one or more 802.11 standards to receive one or more of the services from the radio network 106 and/or 108, as will be appreciated by those skilled in the art.

The mobile cellular communication device 104 in one example comprises an instance of a recordable data storage medium 105, as described herein. The mobile cellular communication device 104 in one example comprises one or more notifications 109, for example, stored in the recordable data storage medium 105. The notification 109 in one example comprises voice recordings, sounds, visual effects, and/or vibrations. In one example, the mobile cellular communication device 104 presents the notification 109 to the user of the mobile cellular communication device 104. In a further example, the mobile cellular communication device 104 compares disparate radio technologies and then selects a notification 109 to present to the user of the mobile cellular communication device 104, as described herein.

The radio network 106 in one example comprises a radio terminal 110 and a broadband interface 112. The radio terminal 110 in one example comprises a wireless local area network access point ("WLAN"). The radio terminal 110 employs an 802.11 standard in one example to provide a radio communication service. The broadband interface 112 in one example comprises a digital subscriber line (DSL), cable modem, or T-1 connection.

The radio network 106 in one example serves to provide one or more services to the mobile cellular communication device 104. Exemplary services comprise voice services, data services, and short message service ("SMS"). The radio terminal 110 serves to provide a communication path in one example to the mobile cellular communication device 104 via electromagnetic radiation signals. The broadband interface 112 in one example serves to provide a communication path between the radio terminal 110 and the radio network 108.

The radio network 108 in one example comprises a radio terminal 114, a radio terminal interface 116, an application server 118, a notification store 120, a home network interface 122, and a home network 124. The radio network 108 in one example comprises a portion of a third generation ("3G") wireless network. The radio terminal 114 in a further example comprises a universal mobile telephone system Node B. The radio terminal interface 116 in one example comprises a serving general packet radio service support node ("SGSN") or a packet data serving node ("PDSN"). The radio terminal interface 116 in another example comprises a visited mobile switching center ("VMSC").

The notification store 120 in one example comprises a recordable data storage medium 105, as described herein. In one example, the notification store 120 comprises a media resource function ("MRF"). The notification store 120 in one example comprises one or more notifications 109, for example, voice recordings, sounds, visual effects, and/or vibrations. The notification store 120 in one example stores the notifications 109, for example, in the recordable data storage medium 105. The home network interface 122 in one example comprises a gateway general packet radio service support node ("GGSN"). The home network 124 in one example comprises an internet protocol multimedia subsystem ("IMS").

In one example, the radio network 108 serves to provide one or more services to the mobile cellular communication device 104. Exemplary services comprise voice services, data services, and short message service ("SMS"). The radio terminal 114 in one example serves to provide a communication path via electromagnetic radiation signals for the services used by the mobile cellular communication device 104. The radio terminal interface 116 serves to provide a communication path in one example between the radio terminal 114 and the application server 118. The radio terminal interface 116 serves to compare disparate radio technologies in one example and select a notification 109 to present to the user of the mobile cellular communication device 104. The application server 118 in one example serves to compare disparate radio technologies and select a notification 109 of the notification store 120 to present to the user of the mobile cellular communication device 104. The home network interface 122 serves to provide a communication path in one example between the radio terminal interface 116 and the home network 124. The home network 124 in one example serves to provide content for the services received by the mobile cellular communication device 104, for example, a voice call or data transmission.

The radio terminal 110 in one example serves to synchronize with the mobile cellular communication device 104. Synchronization of the mobile cellular communication device 104 with one of the radio terminals 110 or 114 allows direct communication via electromagnetic radiation signals between the radio terminal 110 or 114 and the mobile cellular communication device 104. The mobile cellular communication device 104 in one example selects one of the radio terminals 110 or 114 for synchronization based on factors such as signal strength, signal integrity, and current load on the radio terminal 110 or 114.

As the user of the mobile cellular communication device 104 roams throughout service coverage areas of the radio network 106 and radio network 108, the mobile cellular communication device 104 synchronizes with different ones of the radio terminals 110 and 114. When the user of the mobile cellular communication device 104 is receiving one or more services from the radio network 106 or radio network 108 in an active communication session, the radio terminals 110 and 114 perform a handoff of the active communication session of the user of the mobile cellular communication device 104, as will be appreciated by those skilled in the art. The active communication session of the user of the mobile cellular communication device 104 in one example comprises an in-progress voice call and/or data transmission originated by or terminated to the mobile cellular communication device 104.

The mobile cellular communication device 104 and the components of the radio network 106 and the radio network 108 in one example cooperate and employ communication protocols to communicate session management information of the active communication session of the user of the mobile cellular communication device 104. The components of the radio network 106 and the radio network 108 in one example employ a session initiation protocol, a mobile application part ("MAP"), and/or an integrated services digital network user part ("ISUP") to communicate the session management information. The mobile cellular communication device 104 in one example employs a session initiation protocol to communicate the session management information. The radio terminal interface 116 in one example employs a proprietary communication protocol to communicate the session management information with the mobile cellular communication device 104 through the radio terminal 114. Exemplary information communicated between the mobile cellular communication device 104 and the components of the radio network 106 and radio network 108 comprise indications of a handoff and indications of notifications to communicate to the user of the mobile cellular communication device 104, as will be appreciated by those skilled in the art.

Presented is an illustrative description of the mobile cellular communication device 104, the radio network 106, and the radio network 108 performing a handoff of an active communication session for a user of the mobile cellular communication device 104. As the mobile cellular communication device 104 travels through a service coverage area of the radio network 106 and a service coverage area of the radio network 108, the radio terminal 110, the radio terminal 114, and the mobile cellular communication device 104 perform a handoff of the active communication session between the radio network 106 and the radio network 108, as will be appreciated by those skilled in the art.

In one example, upon the handoff, the mobile cellular communication device 104 performs a comparison of the respective radio technologies of the radio network 106 and the radio network 108. If the comparison shows that the respective radio technologies of the radio network 106 and the radio network 108 are disparate, the mobile cellular communication device 104 selects one or more notifications 109 to be presented to the user (not shown) of the mobile cellular communication device 104. The respective radio technologies are considered disparate if they are not directly compatible, for example, an 802.11 compatible radio technology and a 3G compatible radio technology.

In yet another example, a network infrastructure device of the radio network 108 performs a comparison of the respective radio technologies of the radio network 106 and the radio network 108, for example, the application server 118. Exemplary network infrastructure devices of the radio network 108 comprise the radio terminal interface 116 and the application server 118. If the comparison shows that the respective radio technologies of the radio network 106 and the radio network 108 are disparate, the network infrastructure device of the radio network 108 selects one or more notifications 109 to be presented to the user of the mobile cellular communication device 104.

The notifications 109 in one example serve to notify the user of the mobile cellular communication device 104 of a change in a billing rate of the active communication session. The notifications 109 in another example serve to promote a mask of a gap in time in the active communication session during the comparison of the respective radio technologies of the radio network 106 and the radio network 108 by the mobile cellular communication device 104. Exemplary notifications 109 comprise one or more of audio, visual, and tactile notifications, in one example, the notification 109 comprises a tone or voice recording played through a speaker (not shown) of the mobile cellular communication device 104. In another example, the notification 109 comprises a text or graphic message to the user displayed on a screen (not shown) of the mobile cellular communication device 104. In yet another example, the notification 109 comprises a vibration of the mobile cellular communication, device 104 In one example, a plurality of notifications 109 is communicated to the user of the mobile cellular communication device 104.

One or more of the mobile cellular communication device 104, the radio terminal 110, the radio terminal interface 116, and the notification store 120 in one example comprise the notifications 109. The mobile cellular communication device 104 in one example presents the notifications 109 to the user of the mobile cellular communication device 104. The notifications 109 for a handoff are changed in one example by the respective network operator of the communication networks 106 and 108 or the user of the mobile cellular communication device 104. In one example, the network operator of the communication network 106 changes a notification 109 of the handoff stored by a component of the communication network 106 to reflect a change in billing rate for a service of the communication network 106 due to the time of day. In another example, the user of the mobile cellular communication device 104 changes a notification 109 of the handoff according to the preference of the user.

Figure 2:
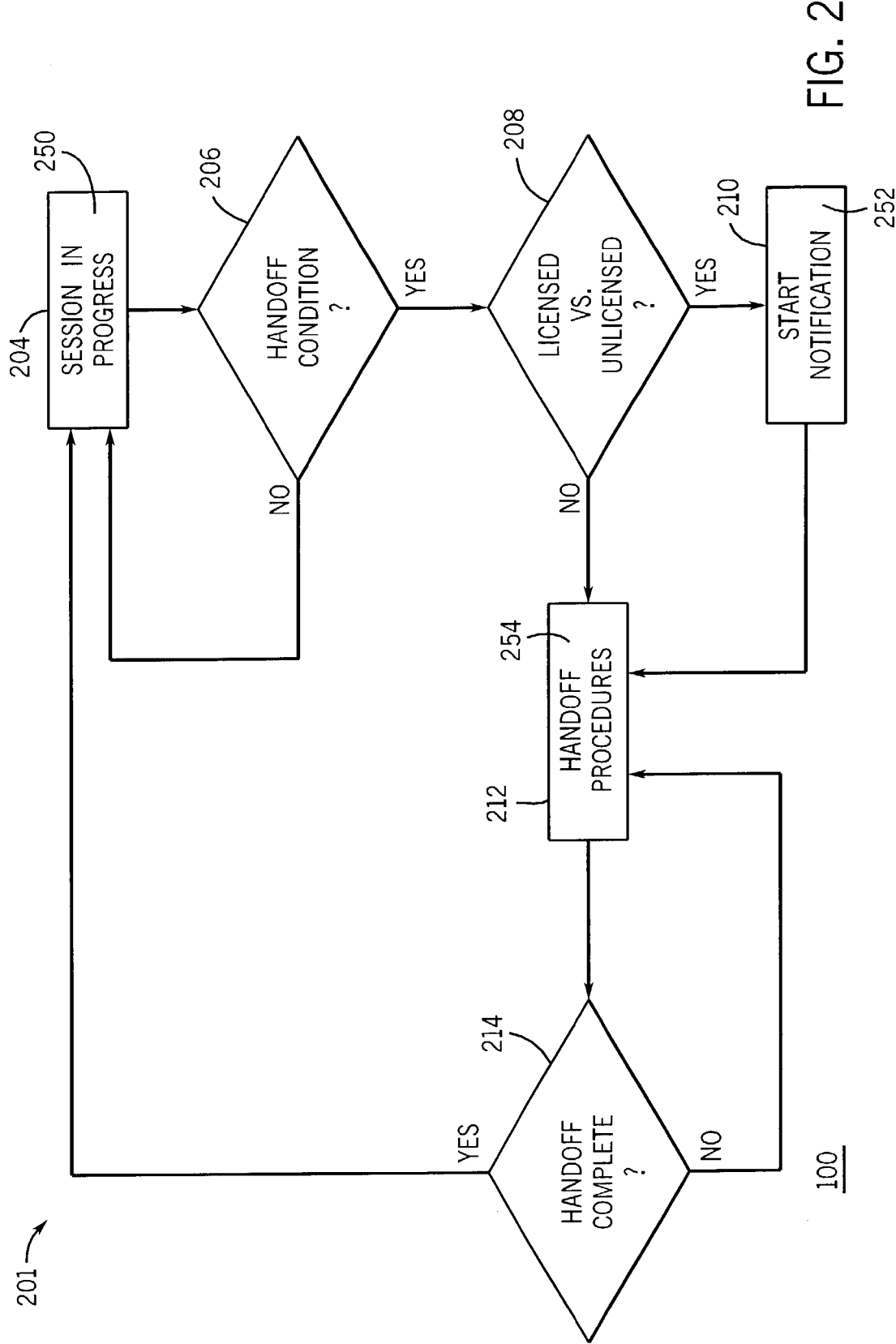
FIG. 2 is a representation of exemplary logic for a notification of a handoff between the radio networks of the apparatus of FIG. 1.

Turning to FIG. 2, exemplary logic 201 serves to notify the user of the mobile cellular communication device 104 when the mobile cellular communication device 104, the radio network 106, and the radio network 108 perform a handoff of the active communication session of the user. The logic 201 employs one or more steps, for example, STEPS 204, 206, 208, 210, 212, and 214. In one example, the mobile cellular communication device 104 compares the radio technology employed to communicate with the radio network 106 and the radio network 108, selects and presents a notification to communicate to the user, and completes the handoff procedure.

In the logic 201, the mobile cellular communication device 102 passes through a number of states in traversing the steps. At STEP 204, the mobile cellular communication device 104 occupies Session in Progress state 250. At STEP 210, the mobile cellular communication device 104 occupies Start Notification state 252. At STEP 212, the mobile cellular communication device 104 occupies Handoff Procedures state 254, as described herein.

The mobile cellular communication device 104 begins in the Session in Progress state 250 at STEP 204 and then proceeds to STEP 206. If a handoff condition is not met, then STEP 206 proceeds to STEP 204. If a handoff condition is met, then STEP 206 proceeds to STEP 208. If the radio technology employed by the radio network 106 and the radio technology employed by the radio network 108 are both 802.11 compatible radio technologies, STEP 208 proceeds to STEP 212. If the radio technology employed by the radio network 106 and the radio technology employed by the radio network 108 are both 3G compatible radio technologies, STEP 208 proceeds to STEP 212.

If the radio technologies employed by the radio network 106 is compatible with the 802.11 radio technology and the radio technology employed by the radio network 108 is compatible with the 3G radio technology, the mobile cellular communication device 104 proceeds to the Start Notification state 252 at STEP 210, and then proceeds to STEP 212. The mobile cellular communication device 104 in one example proceeds from STEP 210 to STEP 212 before finishing the presentation of the notifications. STEP 210 and STEP 212 in one example occur simultaneously. If the radio technologies employed by the radio network 106 is compatible with the 3G radio technology and the radio technology employed by the radio network 108 is compatible with the 3G radio technology, the mobile cellular communication device 104 proceeds to the Start Notification state 252 at STEP 210, and then proceeds to STEP 212.

At STEP 212, the mobile cellular communication device 104 proceeds to the Handoff Procedures state 254, and then to STEP 214. If the handoff is not yet complete, STEP 214 proceeds to STEP 212. If the handoff has completed, the mobile cellular communication device 104 proceeds to the Session in Progress state 250 at STEP 204.

The apparatus 100 in one example employs one or more computer readable media. Examples of a computer-readable medium for the apparatus 100 comprise the recordable data storage medium 105 of the mobile cellular communication device 104 and the recordable data storage medium 105 of the notification store 120. For example, the computer-readable medium for the apparatus 100 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
   a mobile cellular communication device that employs one or more of a plurality of radio technologies to support one or more communication sessions of a user over one or more of a plurality of radio networks;
   wherein the plurality of radio technologies comprise a first radio technology and a second radio technology, and wherein the first radio technology and the second radio technology comprise respective radio technologies that are not directly compatible; and
   wherein the one or more communication sessions comprise an active communication session of the user, wherein the active communication is associated with the mobile cellular communication device; and
   wherein the plurality of radio networks comprise a first radio network and a second radio network, wherein the first radio network employs the first radio technology, and wherein the second radio network employs the second radio technology, and wherein a broadband interface provides a communications path between the first radio network and the second radio network, and wherein the broadband interface comprises a digital subscriber line (DSL); and
   wherein upon a handoff of the active communication session between the respective radio technologies that are not directly compatible of the first radio network and the second radio network, the mobile cellular communication device presents to the user one or more notifications of the handoff between the radio technologies that are not directly compatible, and wherein at least one of the one or more notifications is a visual notification, and wherein the visual notification comprises a graphic message displayed on a screen of the mobile cellular communication device.

2. The apparatus of claim 1, wherein the mobile cellular communication device employs a third generation cellular (3G) compatible radio technology to communicate with the first radio network and an 802.11 compatible radio technology to communicate with the second radio network, and wherein the 3G compatible radio technology and the 802.11 compatible radio technology are not directly compatible; and
   wherein upon the handoff of the active communication session between the 3G compatible radio technology and the 802.11 compatible radio technology, the mobile cellular communication device presents to the user the one or more notifications of the handoff between the 3G compatible radio technology and the 802.11 compatible radio technology that are not directly compatible.

3. The apparatus of claim 1, wherein at least one of the one or more notifications comprise one or more of an audio, the visual, and a tactile notification of a change in billing rate; and
   wherein upon the handoff of the active communication session between the respective radio technologies that are not directly compatible, the mobile cellular communication device presents to the user the one or more of the audio, the visual, and tactile notification of the change in billing rate for the active communication session.

4. The apparatus of claim 1,
   wherein upon the handoff of the active communication session between the respective radio technologies that are not directly compatible, the mobile cellular communication device presents to the user the one or more of an audio, the visual, and a tactile notification during an occurrence of a gap in the active communication session during the handoff.

5. The apparatus of claim 1, wherein the mobile cellular communication device makes a determination of the one or more notifications for presentation to the user through performance of a comparison of the radio technologies employed by the first radio network and the second radio network.

6. The apparatus of claim 5, wherein the mobile cellular communication device stores at least one of the one or more notifications; and
   wherein upon the handoff of the active communication session between the respective radio technologies that are not directly compatible, the mobile cellular communication device presents to the user the at least one of the one or more notifications during an occurrence of a gap in the active communication session during the handoff.

7. The apparatus of claim 5 in combination with a network infrastructure device of the first radio network, wherein the network infrastructure device stores at least one of the one or more notifications; and
   wherein the mobile cellular communication device causes the network infrastructure device to send the at least one of the one or more notifications to the mobile cellular communication device for presentation to the user.

8. The apparatus of claim 5 in combination with a network infrastructure device of the second radio network, wherein the network infrastructure device stores at least one of the one or more notifications; and
   wherein the mobile cellular communication device causes the network infrastructure device to send the at least one of the one or more notifications to the mobile cellular communication device for presentation to the user.

9. The apparatus of claim 5, wherein the performance of the comparison is performed by an application server.

10. The apparatus of claim 1 in combination with a network infrastructure device of the first radio network, wherein the network infrastructure device makes a determination of the one or more notifications for presentation to the user through performance of a comparison of the radio technologies employed by the first radio network and the second radio network.

11. The apparatus of claim 10, wherein the mobile cellular communication device stores at least one of the one or more notifications; and
wherein upon the handoff of the active communication session between the respective radio technologies that are not directly compatible, the mobile cellular communication device presents to the user the at least one of the one or more notifications during an occurrence of a gap in the active communication session during the handoff.

12. The apparatus of claim 10, wherein the network infrastructure device stores at least one of the one or more notifications; and
wherein the network infrastructure device sends the at least one of the one or more notifications to the mobile cellular communication device for presentation to the user.

13. The apparatus of claim 10 in combination with one or more additional network infrastructure devices of the first radio network, wherein the one or more additional network infrastructure devices store at least one of the one or more notifications; and
wherein the network infrastructure device causes the one or more additional network infrastructure devices to send the at least one of the one or more notifications to the mobile cellular communication device for presentation to the user.

14. The apparatus of claim 1 in combination with a network infrastructure device of the first radio network, wherein the network infrastructure device stores a plurality of available notifications that comprise the one or more notifications; and
wherein the network infrastructure device receives one or more inputs from a network operator; and
wherein the network infrastructure device employs the one or more inputs and cooperates with the mobile cellular communication device to make a selection of one or more selected notifications from the plurality of available notifications; and
wherein upon the handoff of the active communication session between the respective radio technologies that are not directly compatible, the mobile cellular communication device presents to the user the one or more selected notifications as an indication of the handoff between the radio technologies that are not directly compatible.

15. The apparatus of claim 1, wherein the one or more notifications comprise the visual notification and an audio notification, and wherein the audio notification comprises a tone or a voice recording played through a speaker of the mobile cellular communication device.

16. The apparatus of claim 1, wherein the visual notification comprises a text message or the graphic message displayed on the screen of the mobile cellular communication device.

17. The apparatus of claim 1, wherein the one or more notifications comprise the visual notification and a tactile notification, and wherein the tactile notification comprises a vibration of the mobile cellular communication device.

18. The apparatus of claim 1, wherein components of the first radio network and the second radio network employ a session initiation protocol, a mobile application part (MAP), and an integrated services digital network user part (ISUP) to communicate session management information.

19. A method, comprising the steps of:
performing a comparison of a first radio technology and a second radio technology, upon a handoff of an active communication session of a mobile cellular communication device between the first radio technology and the second radio technology, to make a determination that the first radio technology and the second radio technology comprise radio technologies that are not directly compatible;
selecting one or more notifications to provide to a user of the mobile cellular communication device based on the determination that the first radio technology and the second radio technology comprise radio technologies that are not directly compatible, wherein at least one of the one or more notifications is a visual notification, and wherein the visual notification comprises a graphic message displayed on a screen of the mobile cellular communication device; and
communicating the one or more notifications to the user of the mobile cellular communication device as an indication of the handoff of the active communication session between the radio technologies that are not directly compatible;
wherein a first radio network employs the first radio technology, and wherein a second radio network employs the second radio technology; and
wherein a broadband interface provides a communications path between the first radio network and the second radio network, and wherein the broadband interface comprises a digital subscriber line (DSL).

20. The method of claim 19, wherein the step of performing the comparison of the first radio technology and the second radio technology, upon the handoff of the active communication session of the mobile cellular communication device between the first radio technology and the second radio technology, to make the determination that the first radio technology and the second radio technology comprise radio technologies that are not directly compatible further comprises the steps of:
monitoring for a handoff of an active communication session of a mobile cellular communication device;
performing a comparison of a first radio technology and a second radio technology employed in the handoff; and
determining that the first radio technology and the second radio technology comprise radio technologies that are not directly compatible.

21. The method of claim 20, wherein the step of determining that the first radio technology and the second radio technology comprise radio technologies that are not directly compatible further comprises the steps of:
comparing a first radio technology and a second radio technology to an 802.11 compatible radio technology; and
comparing the first radio technology and the second radio technology to a 3G compatible radio technology.

22. The method of claim 19, wherein the step of performing the comparison of the first radio technology and the second radio technology, upon the handoff of the active communication session of the mobile cellular communication device between the first radio technology and the second radio technology, to make the determination that the first radio technology and the second radio technology comprise radio technologies that are not directly compatible further comprises the steps of:
comparing a first radio technology and a second radio technology to an 802.11 compatible radio technology; and
comparing the first radio technology and the second radio technology to a 3G compatible radio technology.

23. The method of claim 19, wherein the step of selecting the one or more notifications to provide to the user of the mobile cellular communication device based on the determination that the first radio technology and the second radio technology comprise radio technologies that are not directly compatible further comprises the step of:

signaling one or more network infrastructure devices to provide one or more notifications to the mobile cellular communication device.

24. A computer-readable medium having computer executable instructions for performing steps, comprising:

means in the computer-readable medium for performing a comparison of a first radio technology and a second radio technology, upon a handoff of an active communication session of a mobile cellular communication device between the first radio technology and the second radio technology, to make a determination that the first radio technology and the second radio technology comprise radio technologies that are not directly compatible;

means in the computer-readable medium for selecting one or more notifications to provide to a user of the mobile cellular communication device based on the determination that the first radio technology and the second radio technology comprise radio technologies that are not directly compatible, wherein at least one of the one or more notifications is a visual notification, and wherein the visual notification comprises a graphic message displayed on a screen of the mobile cellular communication device; and means in the computer-readable medium for communicating the one or more notifications to the user of the mobile cellular communication device as an indication of the handoff of the active communication session between the radio technologies that are not directly compatible;

wherein a first radio network employs the first radio technology, and wherein a second radio network employs the second radio technology and wherein a broadband interface provides a communications path between the first radio network and the second radio network, and wherein the broadband interface comprises a digital subscriber line (DSL).

25. The article of claim 24, wherein the means in the computer-readable medium for performing the comparison of the first radio technology and the second radio technology, upon the handoff of the active communication session of the mobile cellular communication device between the first radio technology and the second radio technology, to make the determination that the first radio technology and the second radio technology comprise radio technologies that are not directly compatible comprises:

means in the computer-readable medium for comparing a first radio technology and a second radio technology to an 802.11 compatible radio technology; and means in the computer-readable medium for comparing the first radio technology and the second radio technology to a 3G compatible radio technology.

\* \* \* \* \*